United States Patent [19]
Thiersch et al.

[11] 3,935,078
[45] Jan. 27, 1976

[54] WASTE HEAT EXHAUST SYSTEM FOR SIDE BURNER REGENERATIVE COKE OVEN BATTERIES HAVING A DIVIDED HEATING SYSTEM

[75] Inventors: Friedrich Thiersch; Manfred Strobel; Theo Schmitz, all of Recklinghausen, Germany

[73] Assignee: Firma Carl Still, Germany

[22] Filed: Dec. 20, 1974

[21] Appl. No.: 534,888

[30] Foreign Application Priority Data
Dec. 22, 1973  Germany............................ 2364330

[52] U.S. Cl. ............................................. 202/141
[51] Int. Cl.[2] .......................................... C10B 5/12
[58] Field of Search ........... 202/138, 139, 140, 141, 202/142, 143, 144

[56] References Cited
UNITED STATES PATENTS

| | | | |
|---|---|---|---|
| 1,904,191 | 4/1933 | Becker................................. | 202/143 |
| 2,220,919 | 11/1940 | Staeckel.............................. | 202/144 |
| 3,560,348 | 2/1971 | Kulakov et al...................... | 202/139 |

*Primary Examiner*—Norman Yudkoff
*Assistant Examiner*—Curtis P. Ribando
*Attorney, Agent, or Firm*—McGlew and Tuttle

[57] ABSTRACT

A waste heat exhaust system for side burner regenerative coke oven batteries, comprises a coke oven battery which has a chimney flue connected to one end of the battery and includes a plurality of flue gas ducts which extend in a longitudinal direction and are connected at their one ends to the chimney flue. A plurality of transverse first flues of unequal length have outer ends which are connected to respective waste gas lines which are located on the pusher side of the battery. The first flues extend transversely to the flue gas ducts and they are connected at their inner ends to respective ones of the gas ducts. A similar set of second flues of unequal length have outer ends which are connected to the waste gas lines on the coke side of the battery and they have inner ends which are connected to respective ones of the gas ducts. In the preferred arrangement, three of the first flues are connected to waste gas lines on the pusher side and terminate at their inner ends on one side of the gas ducts and three of the second flues are connected to waste gas lines on the coke side terminating at their inner ends on the opposite side of the wall of the associated gas duct.

4 Claims, 4 Drawing Figures

WASTE HEAT EXHAUST SYSTEM FOR SIDE BURNER REGENERATIVE COKE OVEN BATTERIES HAVING A DIVIDED HEATING SYSTEM

FIELD AND BACKGROUND OF THE INVENTION

This invention relates in general to the construction of coke ovens and, in particular, to a new and useful waste heat exhaust system for side burner regenerative coke oven batteries having a divided heating system.

DESCRIPTION OF THE PRIOR ART

The present invention relates to a waste heat exhaust system for side burner regenerative coke oven batteries which have a divided heating system, which comprises a a plurality of flue gas ducts of mutually identical cross-sections which are disposed beneath the regenerators and extend in the longitudinal direction of the battery, and which communicate with each other and lead into a common chimney flue connection provided at one end of the battery. Waste heat exhaust systems which make it possible to obtain a uniform guidance of the waste gases at one side of the battery are known. During operation, however, only one-half of the flue gas passages is passed through by the waste gases, in each instance, while the other half is not used and lies idle. Only the passages of the "burning-off" side are used in operation, while flue gas passages of the "burning-up" side are used for the exhaust during the next heating period, when the burning-up side becomes the burning-off side or, the burning-down side.

The alternate utilization in each heating period of only a part of the flue gas passages entails a periodical cooling down of the respective part of the flue system structure which, for known reasons, if undesirable. In addition, for very long batteries, that is, those comprising a large number of oven chambers, such a construction requires dimensions of the flue system structure which endanger the stability of the entire battery.

SUMMARY OF THE INVENTION

The present invention provides a waste heat exhaust system for side burner regenerative coke oven batteries which have a divided heating system and in which the periodical cooling down of the flue gas passages at one side of the battery is avoided and which results in a better utilization of space, particularly in long batteries, and also results in gas passage dimensioning which is in acceptable proportion relative to the other parts of the battery and meet with the stability requirements of the entire construction.

The waste heat system, in accordance with the invention, is constructed to ensure that both at the pusher side and the coke side, the individual flue gas ducts are connected to opposite groups of waste gas lines at the bends of waste gas valves by connection through respective first and second groups of transverse flues.

Experience has shown that a particularly advantageous arrangement is a system of six flue gas ducts, of which each is connected with one of six first and second groups of transverse flues which are arranged at both the pusher and the coke sides. For example, a first group of transverse flues extends from the waste gas valve bends located at one end of the battery at the pusher side and they communicate through the short transverse flues with the nearest or outermost flue gas duct extending along the pusher side. The second group, located on the coke side, is connected to waste gas lines, and the transverse flues of the second group extend across substantially all of the longitudinal ducts and are connected to the duct which is closest to the pusher side. In this latter case, the transverse flues must be very long because they extend transversely through almost the entire width of the battery structure. The arrangement includes a second connection of first and second transverse flues which extend from the respective pusher and coke sides to the second coke end from the pusher side. The arrangement is such that each successive first and second transverse flue groups are connected at their inner ends to the next adjacent duct proceeding from the pusher side to the coke side until the groups of transverse flues connect into the duct which is closest to the coke side. The arrangement is such that, in accordance with the invention, none of the flue gas passages is unused at any time of the operation. At any time, all flue gas passages are used uniformly at both sides, in alternating rhythm of the reversal. Therefore, the dimensions of the flue gas ducts can be provided correspondingly small. Their free cross-sectional area can be reduced to approximately one-half so that instead of the usual heights of up to 3 to 4 m, the height of the flue gas duct, in accordance with the invention, is only about 2 m.

While embodying the waste heat exhaust system, according to the invention, prefabricated parts may be used principally for the inner coating of the duct walls. All of the inner surfaces may be sprayed by a special mortar. The mortar layer is applied in a thickness of about 5 cm and retained by means of a wire mesh anchored on the steel concrete prefabricated pieces. This mortar may be applied after the erection so that the total construction time can be reduced.

The erecting time can be further reduced by providing the prefabricated pieces of the flue walls, in accordance with a particular design, with a base, so that the prefabricated piece has the shape of an inverted T ( ). Thus, in such a case, any additional bracing against overturning is unnecessary during erection. A prefabrication of pieces of 2.7 to 2.8 m, corresponding to two oven chamber divisions each, is advantageous.

Accordingly, it is an object of the invention to provide a waste heat exhuast system for side burner regenerative coke oven batteries having a divided heating system, which comprises, a coke oven battery having a chimney flue connected to one end of the battery and a plurality of flue gas ducts extending in a longitudinal direction and connected at their one ends to the chimney flue and, wherein, there are a plurality of transverse first flues of unequal length having outer ends connected to respective waste gas lines on the pusher side of the battery and extending transversely to said flue gas ducts, and having inner ends connected to respective ones of said flue gas ducts, and further including a plurality of transverse second flues of unequal length having outer ends connective to respective waste gas lines on the coke side of the battery, and extending transversely to the flue gas ducts, and having inner ends connected to respective ones of these flue gas ducts.

A further object of the invention, is to provide a waste heat exhaust system for side burner regenerative coke oven batteries, which is simple in design, rugged in construction and economical to manufacture.

For an understanding of the principles of the invention, reference is made to the following description of a typical embodiment thereof as illustrated in the accompanying drawings.

DESCRIPTION OF THE PREFERRED EMBODIMENT

Figure 1:
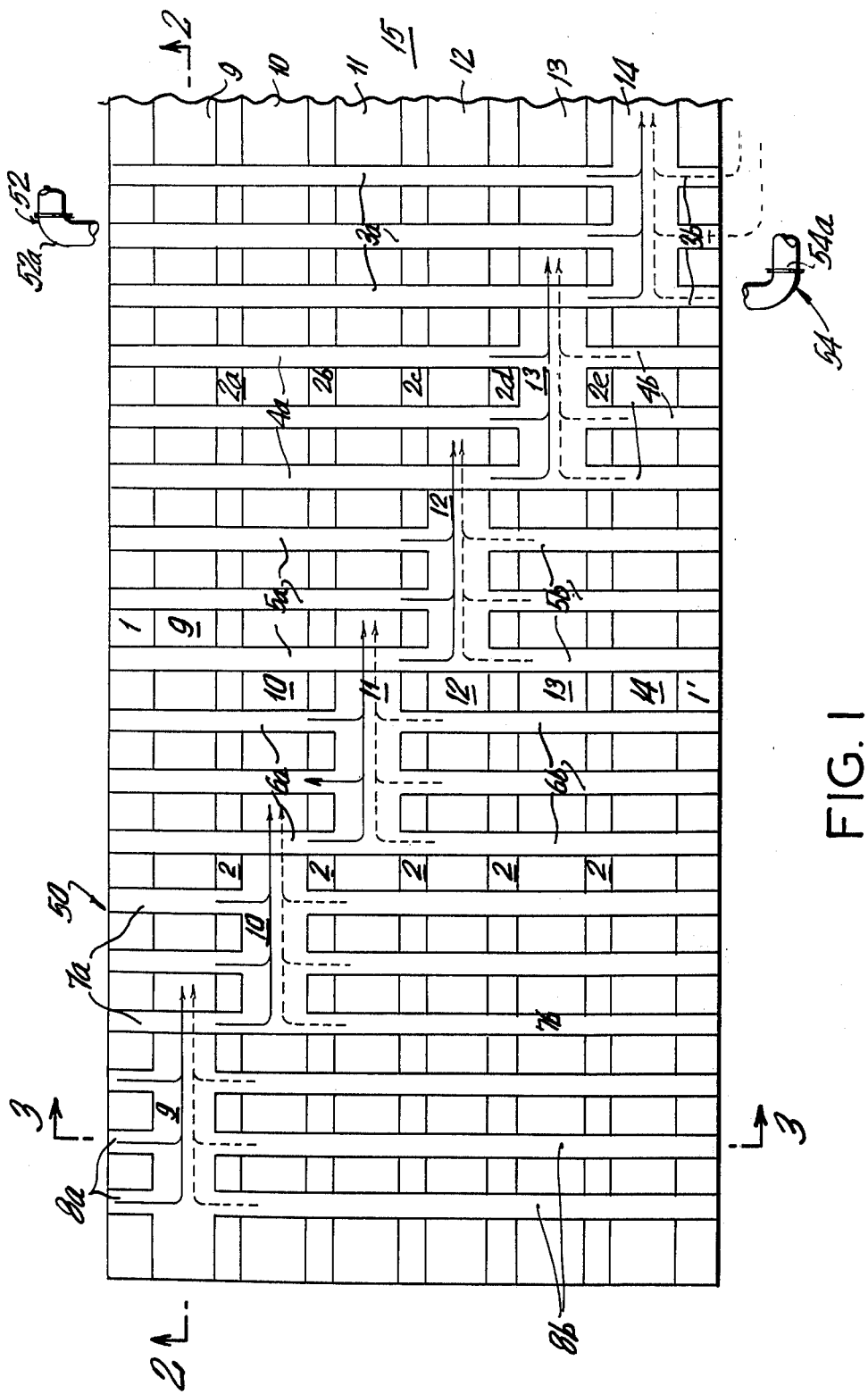
FIG. 1 is a partial horizontal plan view of a waste heat exhaust system constructed in accordance with the invention.

Referring to the drawings in particular, the invention embodied therein, comprises a waste heat exhaust system for a coke oven battery, generally designated 50, which is of a side burner type on one end is connected to a chimney flue 15. The system comprises outer longitudinally extending walls 1 and 1' and with a plurality of longitudinally extending ducts 9, 10, 11, 12, 13 and 14 for conducting flue gas extending longitudinally from the burner and to the chimney flue 15. A series of parallel spaced interior walls 2a, 2b, 2c, 2d and 2e divide the interior into the flue gas ducts 9 to 14.

In accordance with the invention, the coke oven battery 50 is provided with waste gas connections, generally designated 52 and 54 on the pusher side and the coke side of the battery, respectively. Each waste gas connection 52, includes a bend of waste gas valves 52a and 54a, respectively. In the embodiment shown, there are six sets of waste gas connections on each of the pusher and coke sides, and they are connected to individual transverse flues comprising a first set 3a, 4a, 5a, 6a and 7a, which is connected to the waste gas connection 52 on the pusher side and a distinct set 3b, 4b, 5b, 6b and 7b which is connected to a respective waste gas connection 54 on the coke side. Each group or set 3a or 3b includes three separate transversely extending flues which are connected at their exteriors to a respective waste gas connection 52 or 54. Each group comprising sets 3a and 3b, 4a and 4b, 5a and 5b, 6a and 6b, 7a and 7b, and 8a and 8b, include transverse flues of different lengths so that, at the flue end 15, the conduits 3a are longer than the conduits 3b, whereas, at the opposite end, the conduits 8a are shorter than the conduits 8b, and the others vary in dimension between these extremes. Transverse flues 3a and 3b all communicate at their interiors with the duct 14. The first and second sets 4a and 4b communicate at their interiors with the duct 13, the first and second sets 5a and 5b with the duct 12, the first and second sets 6a and 6b with the duct 11, the first and second sets 7a and 7b with the duct 10 and the first and second groups 8a and 8b with the duct 9. The flow out of the various individual ducts is as indicated by the arrows and is generally from the opposite side to the flue 15.

Figure 2:
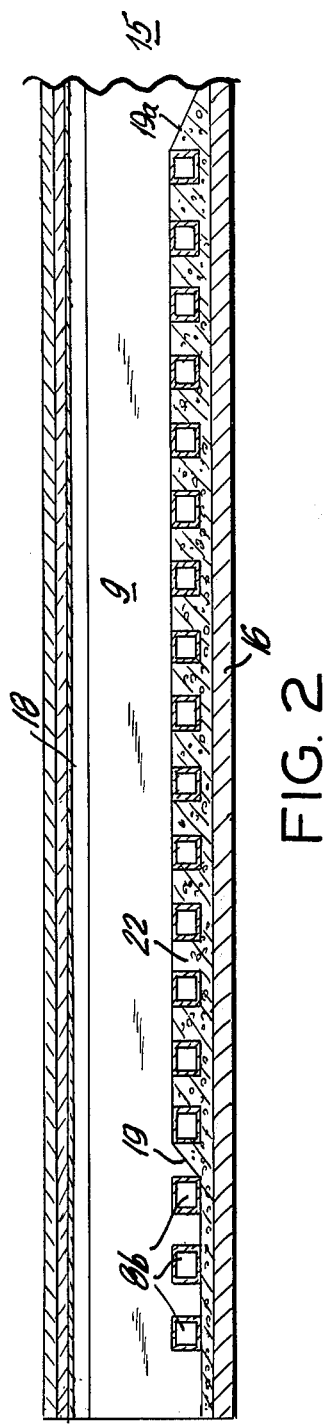
FIG. 2 is a section taken along the line 2—2 of FIG. 1.
Figure 3:
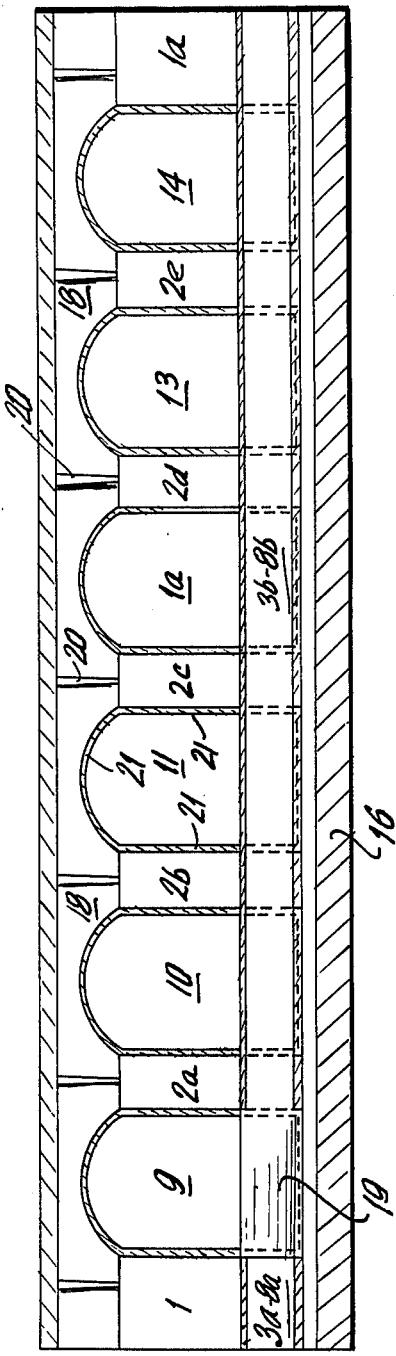
FIG. 3 is a section taken along the line 3—3 of FIG. 1.
Figure 4:
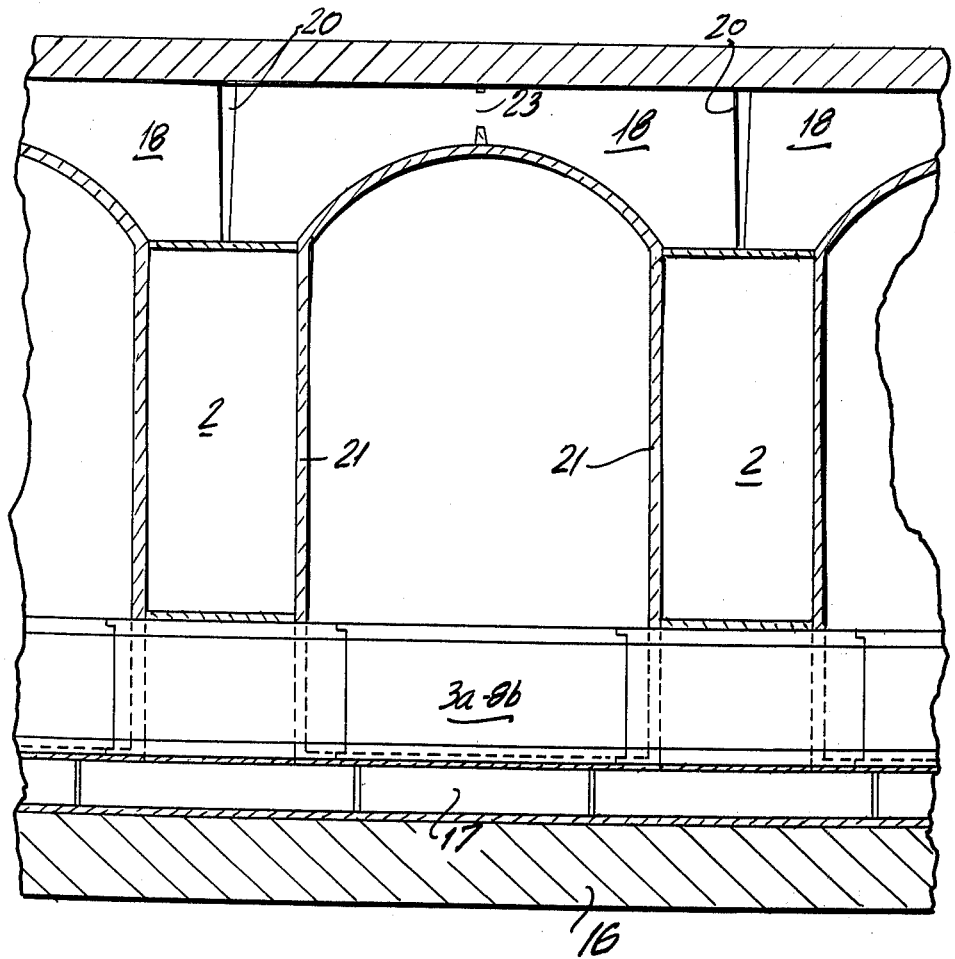
FIG. 4 is an enlarged view of a portion of FIG. 3.

As shown in FIGS. 2 and 3, there is a slab foundation 16 at the bottom of the battery 50, and a base of the flue gas passages 17 is provided thereabove. The tops are provided with vaults 18 which define the upper ends of the flue gas ducts.

As shown in FIG. 2, a sloping bottom portion 19 is provided in the flue gas duct 9, which serves as a transition surface for directing the flow of flue gases from the transverse flues 8a and 8b into the duct 9 and a sloping surface 19a at the end of all of the flue gas ducts 9 to 14 serves to guide the flue gas flow into the chimney flue connection 15. Sloping bottom portions corresponding to surface 19 are also provided in the zones where the transverse flues 4a and 4b and the remainders up to 7a and 7b open into the ducts 10 to 14, respectively. Gaps 20 are provided between individual vault arches, and a layer 21 of thermal insulation covers the inner surfaces of the flue gas ducts 9 to 14. A concrete filling 22 separates the transverse flues 3a, 3b to 8a, 8b and a joint portion 23 is provided in the vault pieces of the flue gas ducts 9 to 14.

While a specific embodiment of the invention has been shown and described in detail to illustrate the application of the principles of the invention, it will be understood that the invention may be embodied otherwise without departing from such principles.

What is claimed is:

1. A waste heat exhaust system for side burner regenerative coke oven batteries having a divided heating system, comprising a coke oven battery having a pusher side and a coke side, a chimney flue connected to one end of said battery, said battery having a plurality of flue gas ducts extending in a longitudinal direction and connected at their one ends to said chimney flue, a plurality of transverse first flues of unequal length having outer ends connected to respective waste gas lines on the pusher side of said battery and extending transversely to said flue gas ducts and having inner ends connected to respective ones of said gas ducts at spaced longitudinal locations along the length thereof, and a plurality of transverse second flues of unequal lengths having outer ends connected to respective waste gas lines on the coke side of said battery and extending transversely to said flue gas ducts and having inner ends connected to respective ones of said gas ducts at spaced locations along the length of said batteries.

2. A waste heat exhaust system, according to claim 1, wherein there are six flue gas ducts and there are six pluralities of first flues and of second flues connected respectively to each one of said ducts.

3. A waste heat exhaust system, according to claim 1, including a waste gas line connected to each of said plurality of first flues and to each of said plurality of second flues on said pusher side and said coke side respectively, each of said plurality of transverse first and second flues comprising three separate flues, the three separate flues of said first flues adjacent the chimney flue end being connected to the duct adjacent said coke side and each three conduits of said first and second flues of the next adjacent ones toward the opposite side from said chimney flue being connected successively to the ducts which are arranged in order from said coke side to said pusher side.

4. A waste heat exhaust system, according to claim 1, wherein said ducts and said flues are made up of prefabricated parts.

* * * * *